(12) United States Patent
Koc (10) Patent No.: US 11,637,508 B2
(45) Date of Patent: Apr. 25, 2023

(54) LINEAR DRIVE FOR PRECISION POSITIONING

(71) Applicant: Physik Instrumente (PI) GmbH & Co. KG, Karlsruhe (DE)

(72) Inventor: Burhanettin Koc, Ettlingen (DE)

(73) Assignee: PHYSIK INSTRUMENTE (PI) GMBH & CO. KG, Karlsruhe (DE)

(*) Notice: Subject to any disclaimer, the term of this patent is extended or adjusted under 35 U.S.C. 154(b) by 217 days.

(21) Appl. No.: 17/284,711

(22) PCT Filed: Oct. 16, 2019

(86) PCT No.: PCT/EP2019/078057
§ 371 (c)(1),
(2) Date: Apr. 12, 2021

(87) PCT Pub. No.: WO2020/079062
PCT Pub. Date: Apr. 23, 2020

(65) Prior Publication Data
US 2021/0359624 A1 Nov. 18, 2021

(30) Foreign Application Priority Data
Oct. 16, 2018 (DE) ............ 10 2018 217 709.0

(51) Int. Cl.
*H02N 2/02* (2006.01)
*H02N 2/04* (2006.01)

(52) U.S. Cl.
CPC ............ *H02N 2/025* (2013.01); *H02N 2/04* (2013.01); *H02N 2/028* (2013.01)

(58) Field of Classification Search
CPC .......... H02N 2/025; H02N 2/04; H02N 2/028; H02N 2/062
See application file for complete search history.

(56) References Cited

U.S. PATENT DOCUMENTS

| 5,786,654 A | 7/1998 | Yoshida et al. |
| 6,188,161 B1 | 2/2001 | Yoshida et al. |

(Continued)

FOREIGN PATENT DOCUMENTS

| DE | 102008003879 A1 | 7/2008 |
| DE | 102012104749 A1 | 12/2012 |

(Continued)

OTHER PUBLICATIONS

International Search Report (PCT/ISA/210) and Written Opinion (PCT/ISA/237) dated Feb. 3, 2020, by the European Patent Office as the International Searching Authority for International Application No. PCT/EP2019/078057.

(Continued)

*Primary Examiner* — Emily P Pham
(74) *Attorney, Agent, or Firm* — Buchanan Ingersoll & Rooney PC (57) ABSTRACT

The present disclosure relates to a linear drive, including: an actuator unit with at least one actuator; two guide elements and a movement element, wherein the movement element is displaceable along both guide elements by a movement generated by the actuator unit as a result of a stick-slip effect. In order to allow a more accurate displacement of the movement element in a compact design of the linear drive, the movement element can be brought into engagement with each of the two guide elements by static friction in order to be displaced along the two guide elements as a result of the stick-slip effect.

20 Claims, 8 Drawing Sheets

(56) References Cited

U.S. PATENT DOCUMENTS

| | | |
|---|---|---|
| 6,940,210 B2 | 9/2005 | Karrai et al. |
| 9,692,323 B2 | 6/2017 | Kortschack et al. |
| 2010/0115671 A1 | 5/2010 | Pryadkin et al. |
| 2011/0018393 A1 | 1/2011 | Nakamura et al. |
| 2012/0212844 A1 | 8/2012 | Stang et al. |
| 2017/0310247 A1 | 10/2017 | Zech et al. |
| 2019/0032759 A1* | 1/2019 | Shu .................. H02N 2/028 |

FOREIGN PATENT DOCUMENTS

| | | |
|---|---|---|
| EP | 0464764 A1 | 1/1992 |
| EP | 2590315 A1 | 5/2013 |
| JP | H07298654 A | 11/1995 |
| KR | 20090021990 A | 3/2009 |
| WO | 9819347 A2 | 5/1998 |

OTHER PUBLICATIONS

Search Report dated Apr. 30, 2020 by the German Patent Office for Application No. 10 2018 217 709.0.

Search Report dated May 20, 2019 by the German Patent Office for Application No. 10 2018 217 709.0.

Office Action (Notice of Grounds of Rejection) dated May 31, 2022, by the Japanese Patent Office in corresponding Japanese Patent Application No. 2021-521045, and an English Translation of the Office Action. (13 pages).

* cited by examiner

XIb - XIb

LINEAR DRIVE FOR PRECISION POSITIONING

The present invention relates to a linear drive, in particular for precision positioning means, comprising: an actuator unit with at least one actuator; two guide elements and a movement element, wherein the movement element can be displaced along both guide elements as a result of a stick-slip effect by means of a movement generated by the actuator unit.

U.S. Pat. No. 5,786,654 discloses (among others locations, in FIG. 1 and column 4, line 19, to column 5, line) a linear drive according to the preamble of patent claim 1, wherein a first one of the two guide elements (16) serve to generate the stick-slip effect (cf. column 4, lines 19 to 31), and a second one of the two guide elements (17) causes a torque-resistance (cf. column 4, lines 19 to 31) to block the rotational degree of freedom of the movement element about the first guide element (cf. column 4, lines 46 to 54). As an alternative to the second guide element (17), a linear ball guide (142, FIG. 23) can be provided, so that the movement element (12) does not rotate about the first guide element (16) when it is moved along the latter.

Independent of the type of actuation, whether it is electromagnetic or piezoelectric, precision guide elements such as linear bearings are widely employed in precision positioning tables. Despite the advantages of the provision of a high stiffness with concentric or parallel surfaces fitting over a large contact surface, these linear guide elements occupy the largest space, thereby limiting the miniaturisation of a device.

The object underlying the present invention is to provide a generic linear drive with a compact design and a more precise displaceability of the movement element.

To achieve this object, the present invention provides the linear drive according to claim 1, comprising: an actuator unit with at least one actuator; two guide elements and a movement element, wherein the movement element can be displaced along both guide elements as a result of a stick-slip effect by means of a movement generated by the actuator unit, wherein the movement element can be brought into engagement with each of the two guide elements by means of static friction in order to be displaced along the two guide elements as a result of the stick-slip effect. Thereby, both guide elements are used for generating the advance of the movement element, and the risk of a tilting of the movement element between the two guide elements, which does exist in a one-sided drive, is reduced. Thus, the clearance between the movement element and each one of the two guide elements required for displacing the movement element can be dimensioned comparably small. Moreover, the movement element can be fixed at both guide elements in a precise position by means of static friction.

Advantageous embodiments of the claimed invention are the subject matter of the depending claims.

The actuator is, for example, an electromagnetic or piezoelectric actuator. Preferably, the movement generated by the actuator unit is an electrically generated oscillation. The actuator unit can comprise one or more actuators, in particular piezo actuators, which serve as electromechanical converters and transmit an electric alternating voltage into an oscillating movement of the piezo actuator.

It can be advantageous for the actuator unit to be embodied to cause to move both guide elements simultaneously and/or synchronously and/or along parallel trajectories. Thereby, the two guide elements can particularly uniformly drive the movement element to generate the advance and can thus extremely accurately position it. It is also possible that the actuator unit can cause both guide elements to move at least in phases simultaneously and/or synchronously and/or along parallel trajectories, and at least in phases asynchronously and/or along non-parallel trajectories.

However, it can also prove to be of assistance if the movement element, in the stress-free state of the actuator unit (or in absence of control voltages or of the movement generated by the actuator unit), is engaged with each of the two guide elements by means of static friction. Thereby, in a standstill of the movement element, a relative movement with respect to each of the two guide elements can be effectively prevented. Mainly for the application of the linear drive in precision positioning means, this embodiment is of particular advantage.

It can moreover prove to be useful if each of the two guide elements and/or the movement element and/or at least one contact section of the movement element is formed of a non-magnetic or non-magnetisable material, preferably ceramics, preferably oxide ceramics, particularly preferred aluminium oxide. There are applications where a linear drive or at least its movement element has to be non-magnetic. If the guide elements are made of non-magnetic materials, such as structural ceramics or titanium, the linear drive, however, is also usable for special applications that require a non-magnetic or non-magnetisable linear drive. Moreover, in this embodiment, a high stick-slip effect between the guide elements and the movement element can be generated.

It can prove to be practical for the actuator unit to comprise two actuators which each drive one of the two guide elements. Preferably, each guide element is articulated or firmly connected to the actuator unit. The two actuators can have an identical design and be connected in parallel to drive the guide elements synchronously with respect to each other and generate a uniform advance of the movement element. Moreover, different movement patterns of the movement element can be represented compared to one single actuator. Preferably, the two actuators can be controlled independently. Thereby, a particular precise fine adjustment of the position of the movement element is also possible.

It can also be advantageous if the actuators are each arranged at one end of the guide elements and are arranged, with respect to a mid-plane perpendicular to the moving direction and bisecting the guide elements in the moving direction, on the same side or on opposite sides. An arrangement of the actuators on the same side of said plane facilitates the assembly of the linear drive, but can lead to different driving forces depending on the position of the movement element. This difference can cause a position-dependent step size of the movement element. In order to solve this problem, it is recommended to arrange the actuators on opposite sides of said plane.

It can be advantageous if each guide element and/or the movement element only have one translational degree of freedom, preferably all in parallel directions. Preferably, the other two translational degrees of freedom and all rotational degrees of freedom of both guide elements and/or the movement element are blocked. Thereby, positional errors during the displacement of the movement element along its travel range can be effectively eliminated. Moreover, the movement control of the movement element is relatively easy.

It can be advantageous if the movement element and the guide elements are configured such that in the stick phase between each guide element and the movement element, contact forces are generated in different directions and preferably symmetrical with respect to one plane. The plane preferably includes the axes of extension of the guide elements. Thereby, the movement element can be particularly easily centred in its intended central position and plane between the two guide elements.

However, it can also be useful if each guide element is embodied as a cylinder, and the trajectory of the guide element preferably extends along the cylinder axis. In this embodiment, the movement element can be positioned both during an advance along the travel range and in a standstill in a particularly stable position. In addition, a linear bearing is normally the most expensive part in a precision stage and can be omitted in this embodiment of the linear drive according to the invention.

It can also make sense for the movement element to receive each guide element in a separate channel-like seating, the channel-like seating being preferably embodied as a V-shaped groove which extends along the respective guide element and opens towards the latter. Thereby, the movement element can be fixed to each of the guide elements in a statically determined and stable manner, and high static frictional forces can be transmitted.

It can prove to be of assistance if the linear drive comprises a preferably closed frame, the frame preferably surrounding the actuator unit, the two guide elements and the movement element, the frame having, in a particularly preferred way, a cuboid outline. In an advantageous variant, the frame comprises four parts which approximately form a rectangle, in particular a basic part, a counterpart and two side parts which connect the basic part and the counterpart. The basic part and the counterpart are, for example, designed as a cuboid. The two side parts can be embodied in the form of a leaf spring or a plate. It can be of advantage for the actuator unit to comprise two actuators. and for the first actuator to be firmly coupled to the frame or the basic part, respectively, while the second actuator is firmly or movably coupled to the frame or the basic part, respectively.

However, it can also be advantageous for each guide element to be mounted resiliently with respect to the frame of the linear drive, preferably in its direction of extension and/or transverse to it, preferably via at least one leaf spring. Thereby, the contact pressure between the movement element and the guide element can be selectively adjusted. Preferably, each guide element is resiliently mounted at the counterpart of the frame against its moving direction, such that the deflection of the guide element in its moving direction leads to an increase of the spring tension.

In an advantageous embodiment, each guide element is slidingly mounted on the frame via a sliding bearing. The sliding bearing can support the guide element, for example sliding between its end-side bearing points, to prevent a bending of the guide element. The sliding bearing is preferably located on a side of the guide element facing away from the movement element.

However, it can also be practicable for each guide element to be resiliently pretensioned in the direction of the movement element and/or in the direction of the actuator unit. Thereby, the contact pressure between the guide element and the movement element, or between the guide element and the actuator element, respectively, is increased. In this way, the oscillation behaviour of the guide element or the static friction between the movement element and the guide element can be selectively adjusted. Preferably, the spring force is applied onto the guide element by a leaf spring and optionally a sliding bearing.

It can moreover make sense if a spring element is fixed to the movement element, and each guide element is received in a channel-like seating which is formed by a section of the movement element and a section of the spring element. By a purposeful selection of the material, the dimensions and/or the attachment points of the spring element, the contact pressure between the respective guide element and the movement element or the spring element, respectively, can be adjusted, whereby the friction and sliding conditions can be directly influenced.

It can also be advantageous for each guide element to comprise a peripheral section which is provided with a resistance material, and for the spring element to comprise slide sections which are each in electrically conductive contact with the peripheral section of the corresponding guide element. In this way, the linear drive can provide the function of a potentiometer by which the position of the movement element can be determined by detecting the electric resistance between a point of the peripheral section of the one guide element and a point of the peripheral section of the other guide element.

It can make sense for the frame and/or the movement element to comprise a mechanical interface which is couplable to the mechanical interface of an identical linear drive, such that the travel ranges of the linear drives coupled to each other extend in planes perpendicular with respect to each other. In this way, a multiaxially displaceable arrangement can be modularly set up from identical linear drives.

A further aspect of the present invention relates to an arrangement, comprising two or three linear drives according to one of the preceding embodiments, wherein the linear drives are coupled to each other such that the travel ranges of the linear drives coupled to each other extend in two or three planes perpendicular with respect to each other. The coupling of the linear drives is preferably accomplished by the mechanical interfaces according to the preceding embodiments.

An additional aspect of the invention relates to a method for determining the position of the movement element, wherein a resistance from a point of the peripheral section of a guide element to a point of the peripheral section of the other guide element is detected. With the determination of the position of the movement element, the movement element can be purposefully moved.

Further preferred developments result from combinations of the features disclosed in the claims, the drawings, and the description.

Terms and Definitions

Linear Drive

The term linear drive designates a drive system leading to a translational movement. The movement of the linear drive can be effected along a travel range in a straight line or in another given course.

Stick-Slip Effect

The stick-slip effect designates the jerky sliding of solid bodies moved against each other and is known, among others, from U.S. Pat. No. 5,786,654. According to the invention, the displacement of the movement element along the guide elements by means of the stick-slip effect comprises a stick phase, in which the movement element is engaged with both guide elements by means of static friction, and a slip phase, in which the movement element moves relative to at least one guide element.

Actuator or Piezo Actuator

The term actuator designates a drive element which converts electric signals into mechanical movement. The actuator is, for example, a piezo actuator.

BRIEF DESCRIPTION OF THE FIGURES

In the drawing:

FIG. 3 shows in view (a) a plan view onto the linear drive according to FIG. 1, and in view (b) a section along line of FIG. 3(a).

FIG. 5 shows various views of the movement element of the linear drive according to FIG. 1, and in particular in view (a) a schematic side view in a viewing direction in the intended direction of movement of the movement element, in view (b) a side view in a viewing direction perpendicular to the intended moving direction of the movement element, and in view (c) a plan view in a viewing direction perpendicular to the intended moving direction of the movement element.

FIG. 9 shows in view (a) a plan view onto the linear drive according to FIG. 8, and in view (b) a section along line IXb-IXb of FIG. 9(a).

FIG. 11 shows in view (a) a plan view onto a linear drive according to a third embodiment, and in view (b) a section along line IXb-IXb of FIG. 11(a).

FIG. 13 shows in view (a) schematically a potentiometer function of the linear drive according to the third embodiment for determining the position of the movement element, and in view (b) exemplified numerical values which illustrate the potentiometer function.

DETAILED DESCRIPTION OF THE PREFERRED EXEMPLIFIED EMBODIMENT

The inventive linear drive 1 according to the preferred exemplified embodiment of the invention comprises an actuator unit, consisting of a pair of piezoelectric multi-layer actuators 3a, 3b each with a guide element 4a, 4b attached thereto in the form of a cylindrical rod 4a, 4b of structural ceramics arranged in parallel within a frame 2.

Figure 2:
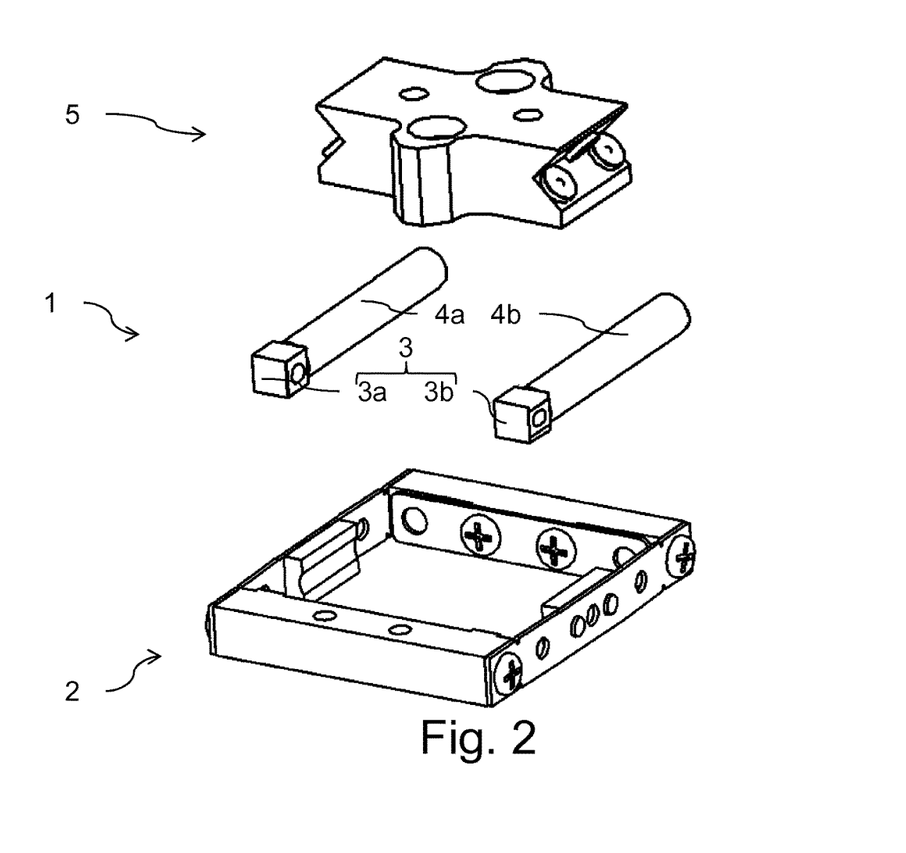
FIG. 2 shows a perspective exploded view of the linear drive according to FIG. 1.

The frame 2 is composed of a cuboid basic part 2a and a cuboid counterpart 2b approximately of the same size. The basic part 2a and the counterpart 2b are connected via two plate-like side parts 2c and 2d to form an approximately rectangular surrounding frame 2 with an essentially cuboid outline, as can be seen, for example, in FIG. 2.

Figure 3A:
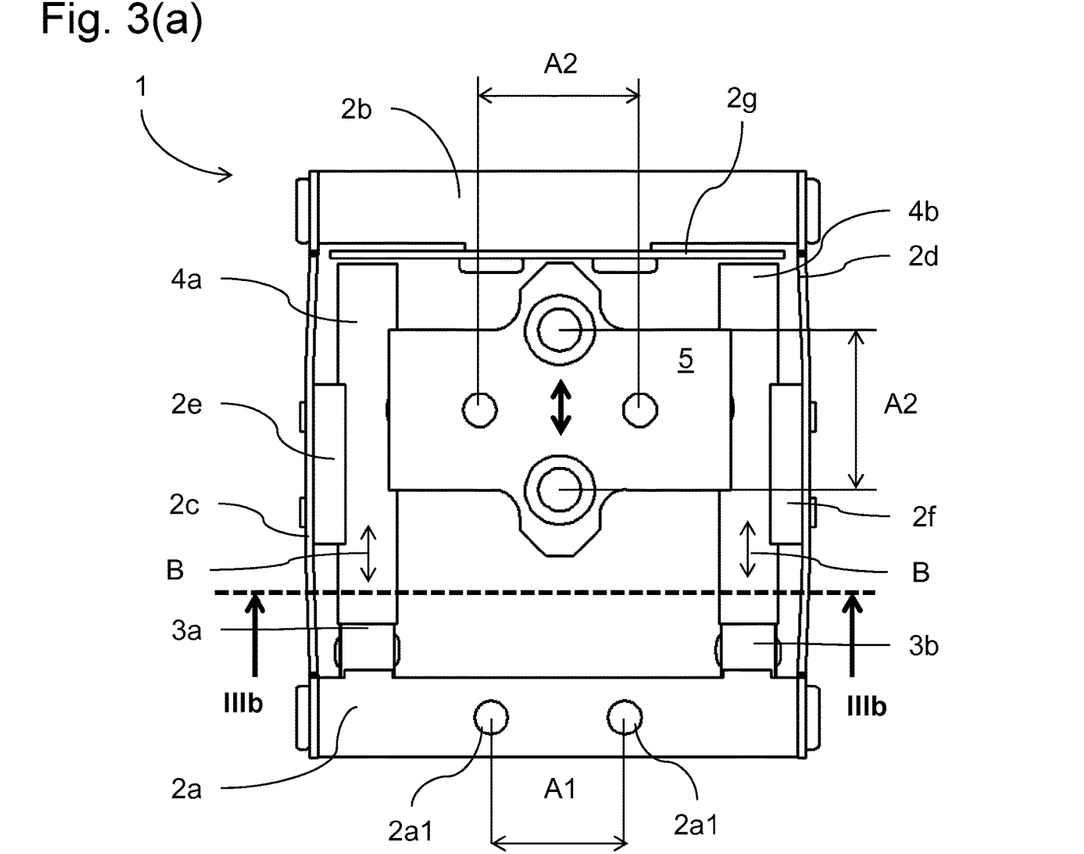

The basic part 2a comprises, on an upper side visible in FIG. 3(a) and preferably also at a side face facing away from the counterpart 2b, two engagement sections 2a1 each formed as screw openings at a predetermined distance A1. The screw openings 2a1 act as standardised interface to mechanically couple the linear drive 1 with another identical linear drive 1, such that the two linear drives 1 perform movements in two planes perpendicular with respect to each other (X; Y). The frame 2 and its components are preferably made of plastics and/or metal and/or ceramics.

A pressure force is exerted, from two sides of the frame 2 by the side parts 2c, 2d formed as leaf spring via half bearings 2e, 2f, onto the guide elements 4a, 4b, and indirectly onto the movement element 5 arranged between the two guide elements 4a, 4b. The half bearings 2e, 2f are designed like a channel and each have a concave inner contour complementary to the cylindrical lateral area of the respective guide element 4a, 4b. The half bearings 2e, 2f support the guide elements 4a, 4b perpendicular to their direction of extension and movement and allow a sliding movement of the guide elements 4a, 4b in their direction of extension and movement. A bending of the guide elements 4a, 4b transverse to their direction of extension and movement, caused by the spread force of the inserted movement element 5, is thereby reduced or prevented, and a contact pressure between the movement element 5 and each of the guide elements 4a, 4b is increased.

The counterpart 2b preferably also has engagement sections (2a1) for coupling with an identical linear drive 1 corresponding to the basic part 2a. At the side facing the basic part 2a, the counterpart 2b comprises centrically an essentially cuboid projection to which a leaf spring 2g extending in a plane is attached. The two ends of the leaf spring 2g facing away from each other in the direction of extension here extend at a distance in parallel to the side of the counterpart 2b facing the basic part 2a and serve as resilient bearing sections for the axial ends of the two guide elements 4a, 4b.

The two drive units of the piezoelectric linear drive 1 have an identical design and each consist of a piezoelectric actuator 3a, 3b, and a guide element 4a, 4b coupled thereto. The piezoelectric actuator 3a, 3b is constructed in layers and has an approximately cubic design. The guide element 4a, 4b has a cylindrical shape with a diameter essentially corresponding to the edge length of the cubic actuator 3a, 3b. By applying an electric alternating voltage to the piezoelectric actuator 3a, 3b, the latter will be deformed such that the guide element 4a, 4b coupled thereto performs an oscillating movement along its axis of extension. The two guide elements 4a, 4b are oriented exactly in parallel with respect to each other and are caused to move synchronously with respect to each other by the associated actuators 3a, 3b. The end faces of the guide elements 4a, 4b facing away from the actuators 3a, 3b are each resiliently mounted by the leaf spring 2g at the counterpart 2b of the frame 2 and are pressed towards the respective actuator 3a, 3b by the leaf spring 2g.

Figure 1:
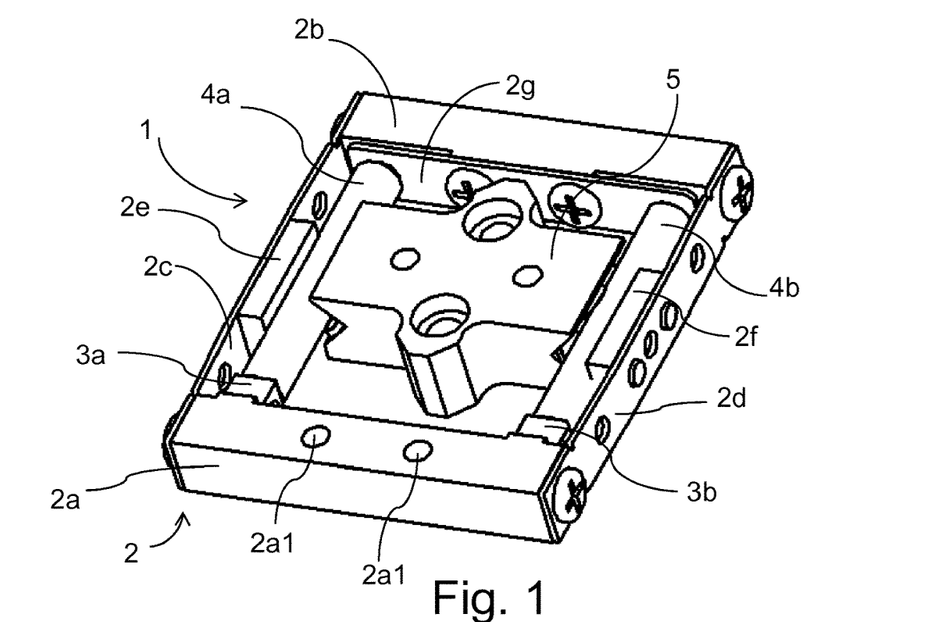
FIG. 1 shows a perspective view of an embodiment of the linear drive according to the invention.

In the assembled state according to FIG. 1, the end of the actuator 3a facing away from the guide element 4a is firmly connected to the basic part 2a of the frame 2. In contrast, the end of the actuator 3b facing away from the guide element 4b can be movably mounted on the frame 2 along the basic part 2a thereof. By a sliding or articulated mounting of an actuator 3b at the basic part 2a of the frame 2, a clamping by a tilting of the movement element 5 between the two guide elements 4a, 4b can be prevented.

Figure 3B:
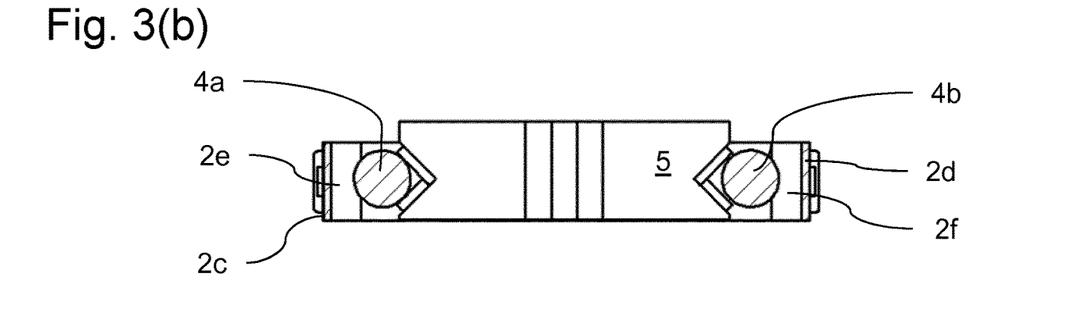
Figure 4:
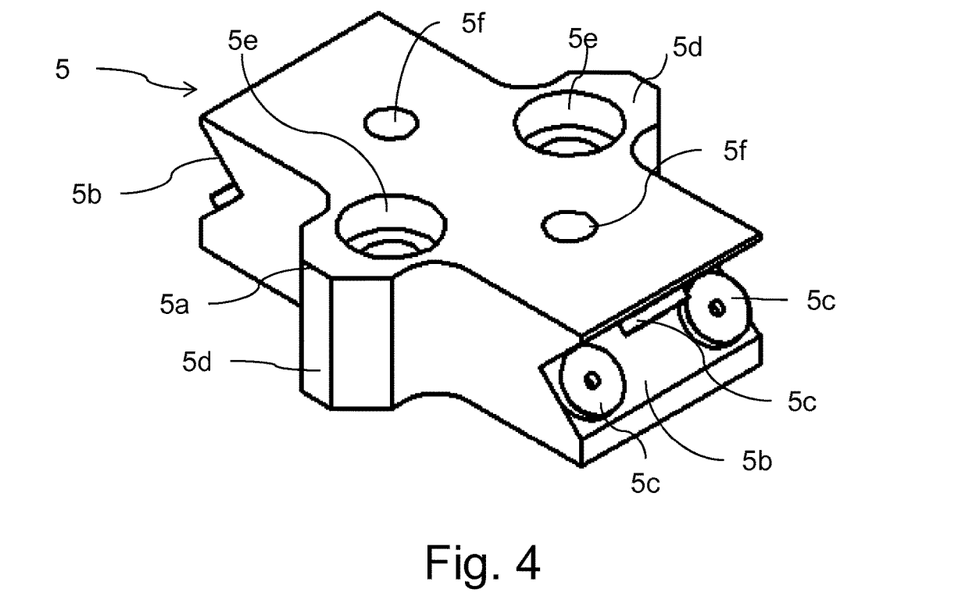
FIG. 4 shows a perspective view of the movement element of the linear drive according to FIG. 1.
Figure 5A:
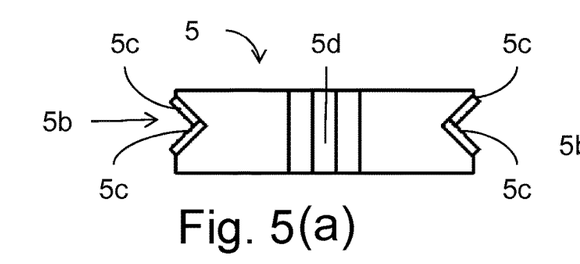
Figure 5B:
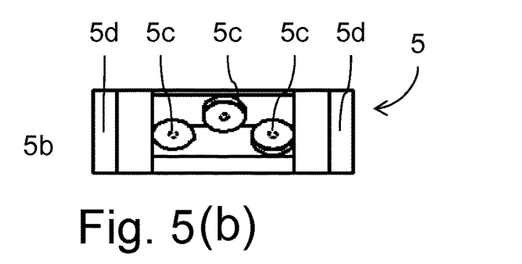
Figure 5C:
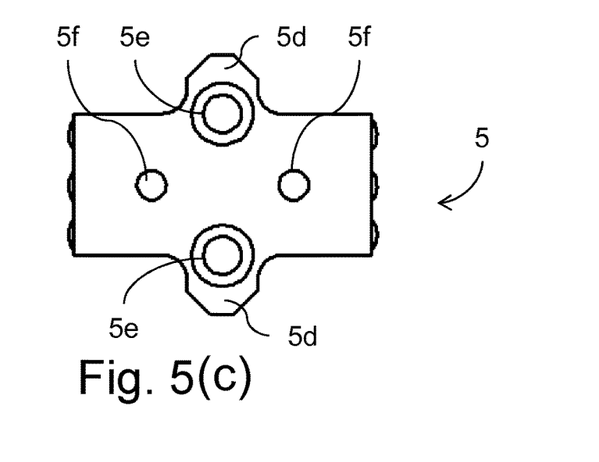

In the present exemplified embodiment, the movement element 5 has an approximately cuboid design. It comprises, at the two smallest side faces, wedge-shaped seatings 5b in the form of channel-like V-grooves extending along the respective guide element 4a, 4b which are embodied, as is illustrated in FIG. 3(b), to receive the respective guide element 4a, 4b therein and be guided thereon with a stick-slip effect. At the two inner surfaces of the wedge-shaped seating 5b facing each other, there are three annular contact sections 5c in the form of friction clutches 5c of structural ceramics each serving as friction elements and alternatingly slipping and sticking, by the stick-slip effect, at the associated contact surface of the respective guide element 4a, 4b. As is illustrated in FIG. 5(c), the cuboid shape of the movement element 5 is interrupted by two projections 5d which extend at opposite sides of the movement element 5 along the intended moving direction of the movement element 5. Between the upper side visible in FIG. 5(c) and the bottom side of the movement element 5 facing away therefrom, through bores or screw openings extend which are embodied as engagement sections 5e, 5f for coupling the linear drive 1 with a further identical linear drive 1. The diameters and distances of these engagement sections 5e and 5f, respectively, are identical, however offset with respect to each other by 90°. Via these engagement sections 5e, 5f, two identical linear drives 1 can be coupled to each other such that their travel ranges extend along two axes (X, Y; cf. FIG. 5) in two planes arranged perpendicular with respect to each other.

In order to displace the movement element 5 along the travel range between the basic part 2a and the counterpart 2b, an electric alternating voltage is applied to the actuator unit 3, such that both guide elements 4a, 4b are caused to move synchronously and in parallel with respect to each other. The acceleration of the two guide elements 4a, 4b is sufficiently small in the stick phase, so that the stick engagement between the movement element 5 and each of the two guide elements 4a, 4b is maintained and the movement element 5 follows the movement of the guide elements 4a, 4b. Consequently, the movement element 5 undergoes an advance along its travel range. By changing the control voltage applied to the actuators 3a, 3b, the moving direction of the guide elements 4a, 4b can be abruptly reversed, such that the movement element 5 moves slidingly along the two guide elements 4a, 4b in a slip phase. In the slip phase, the inertial force of the movement element 5 is larger than the static friction force between the movement element 5 and the two guide elements 4a, 4b.

The engagement structure between the movement element 5 and the two guide elements 4a, 4b here replaces a separate guide means since both the guide elements 4a, 4b and the movement element 5 only have one translational degree of freedom, while the other two translational degrees of freedom and all rotational degrees of freedom of both guide elements 4a, 4b and of the movement element 5 are blocked.

The linear drive 1 operates according to the inertial drive principle. To obtain movements with a plurality of degrees of freedom (DOF), a plurality of linear drives 1 can be attached one upon the other, as is illustrated in FIGS. 6 and 7.

Figure 6:
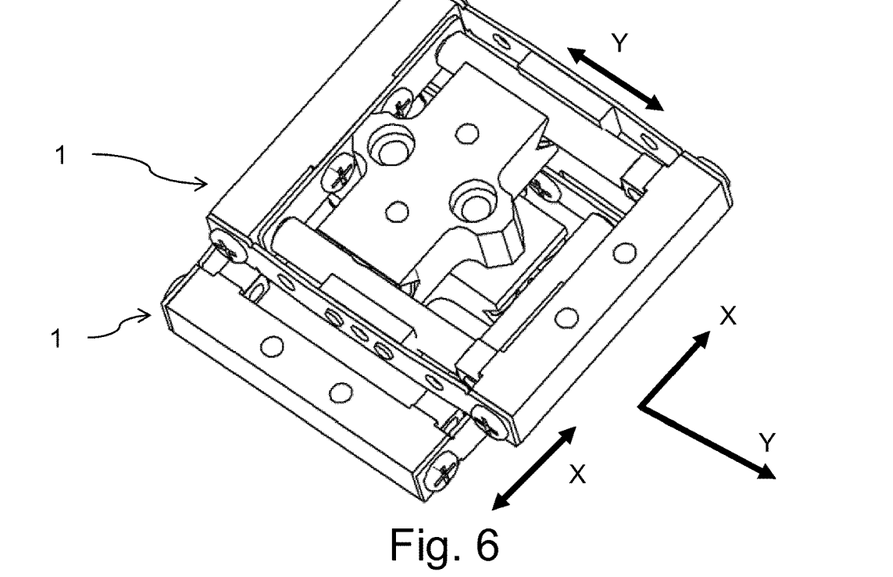
FIG. 6 shows a perspective view of an arrangement A according to the invention, comprising two linear drives according to FIG. 1 whose movement elements are coupled to each other such that the linear drives generate movements in two planes perpendicular with respect to each other.

In the arrangement A according to FIG. 6, two linear drives 1 according to the invention are coupled to each other via respective engagement sections (5e, 5f) of the movement elements 5, such that the travel ranges of the two linear drives 1 extend along two axes X, Y in two planes arranged perpendicularly with respect to each other (leaving the thickness of the linear drives 1 out of consideration).

Figure 7:
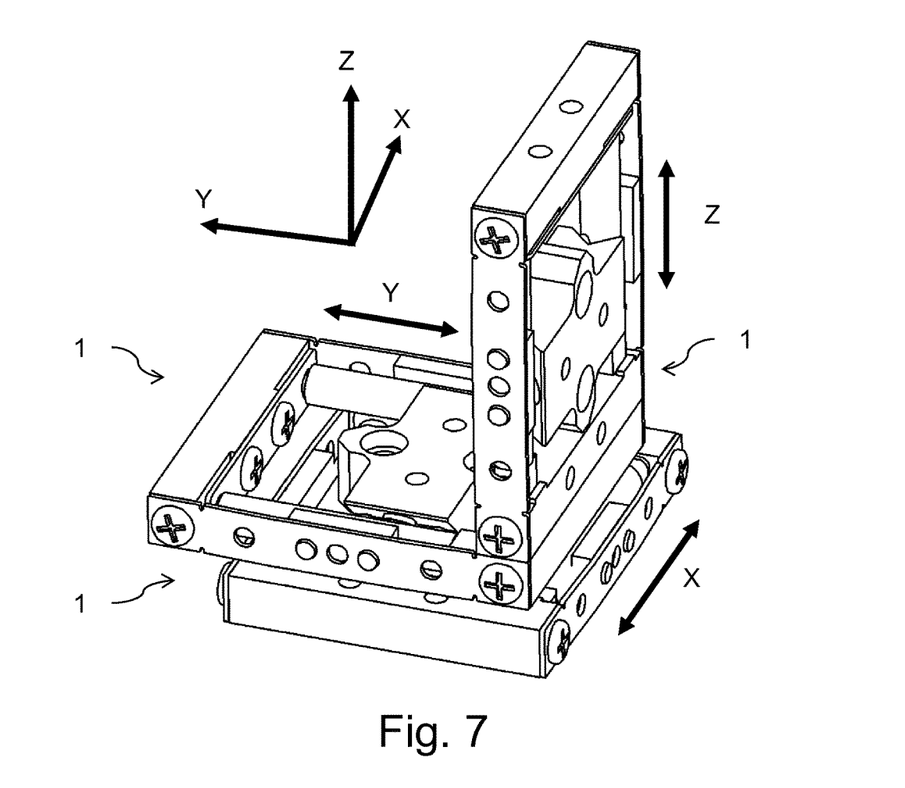
FIG. 7 shows a perspective view of an arrangement B according to the invention, comprising the arrangement A according to FIG. 6 and a further linear drive according to FIG. 1 whose frame is coupled to the frame of a linear drive of the arrangement A such that the three linear drives of the arrangement B generate movements in altogether three planes perpendicular to each other.

In the arrangement B according to FIG. 7, which is based on the arrangement A according to FIG. 6, a further linear drive 1 according to the invention is coupled with its basic part (2a) to the basic part (2a) of a linear drive 1 of the arrangement A, so that the altogether three linear drives 1 extend along three axes X, Y, Z in three planes arranged perpendicularly with respect to each other (leaving the thickness of the linear drives 1 out of consideration).

With the linear drive 1 according to the invention, multiaxially displaceable precision positioning means can be particularly easily and cheaply manufactured.

Figure 8:
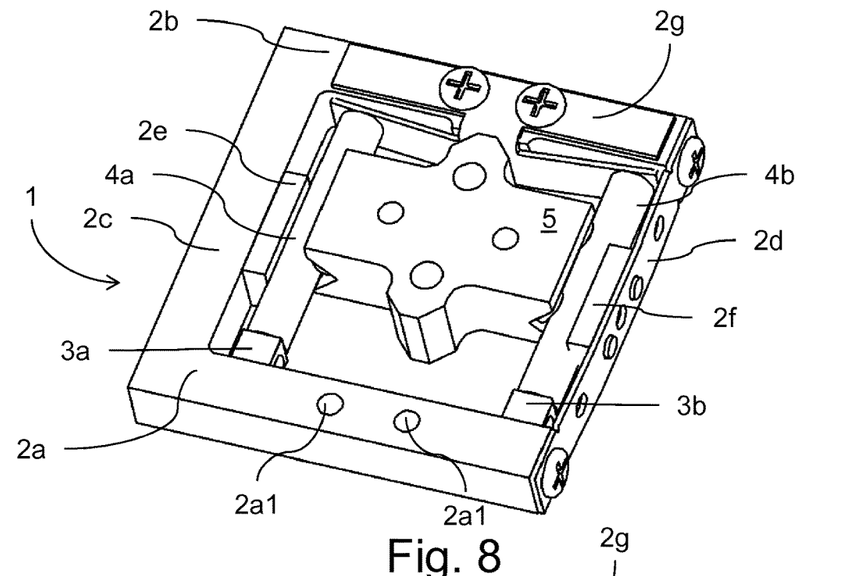
FIG. 8 shows a perspective view of a second embodiment of the linear drive according to the invention.
Figure 9A:
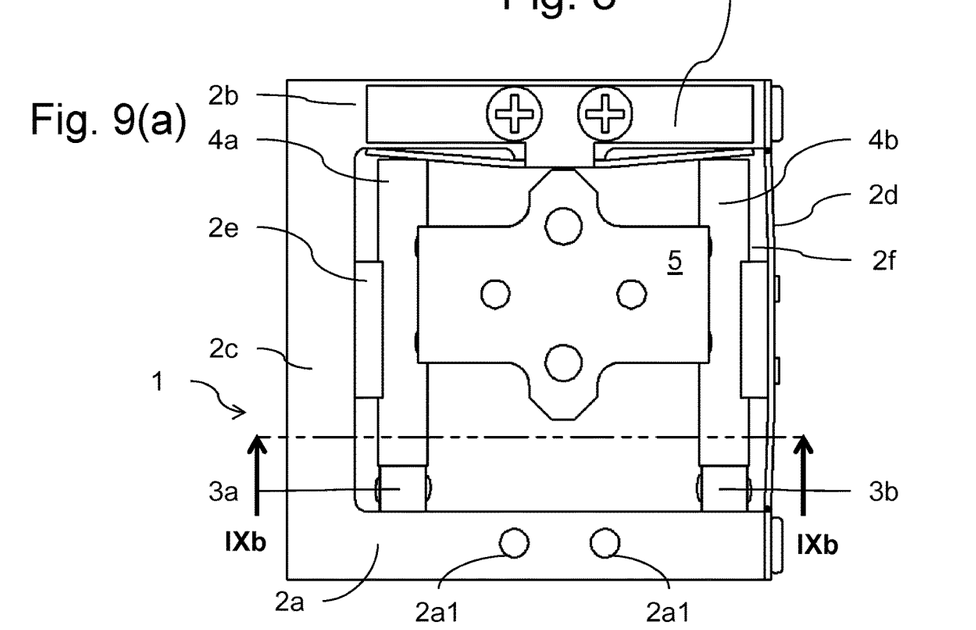
Figure 9B:
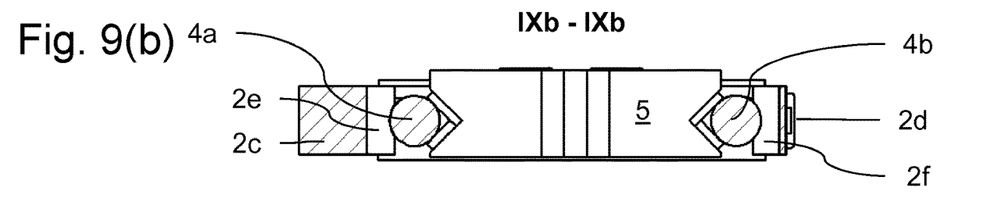
Figure 10:
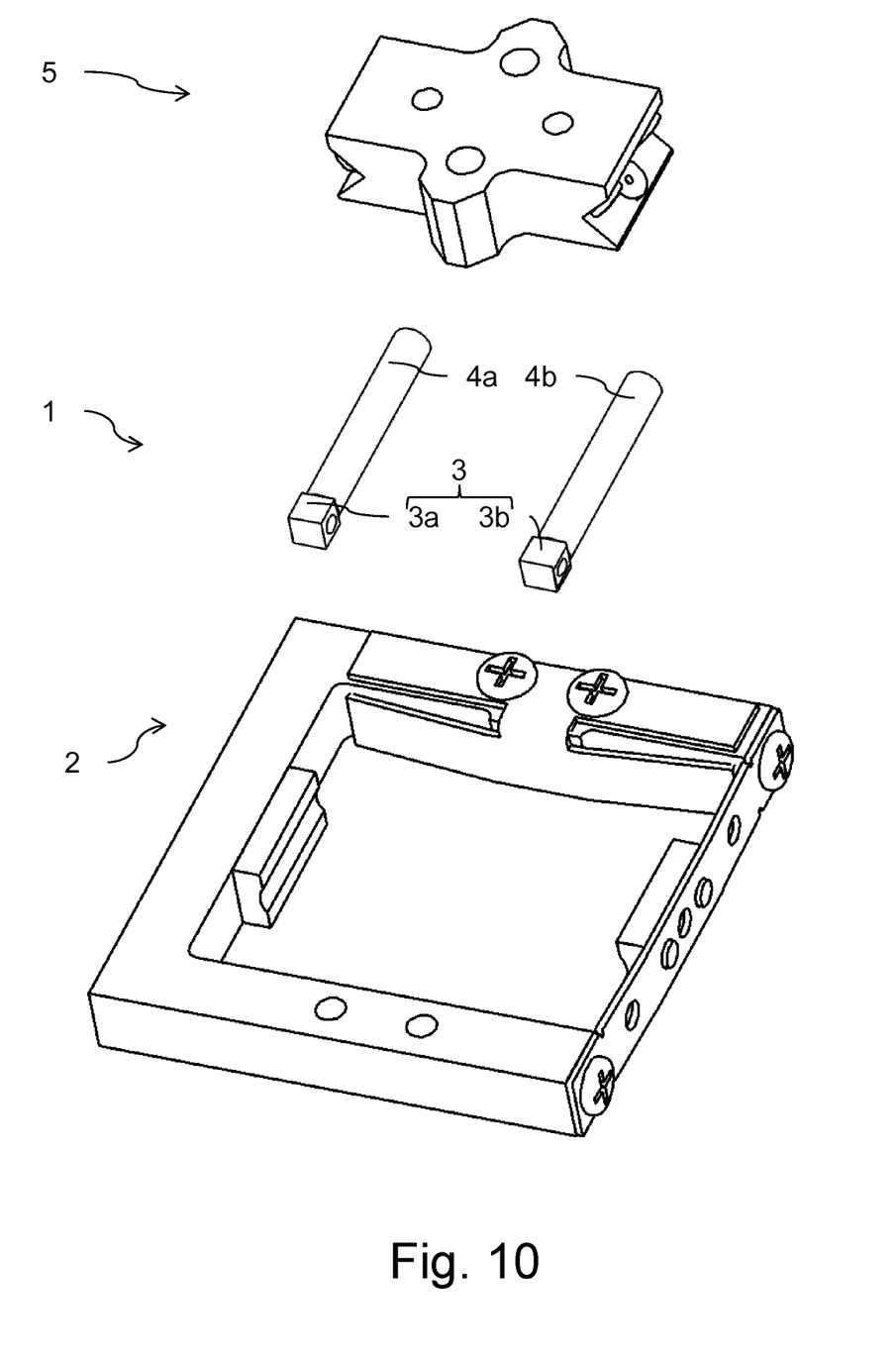
FIG. 10 shows a perspective exploded view of the linear drive according to FIG. 8.

In the second embodiment of the linear drive 1 according to the invention, which will be described below with reference to FIGS. 8 to 10, the frame parts 2a, 2b and 2c are embodied in one piece, different to the first embodiment, and form a C-shaped frame element which is connected with the strip- or plate-like side part 2d to form a rectangle or square. Here, the C-shaped frame element 2a, 2b and 2c is essentially embodied to be rigid and unyielding, while the pretension on the guide elements 4a, 4b and the movement element 5 arranged therebetween is applied by the side part 2d screwed to the C-shaped frame part 2a, 2b, and 2c, the side part 2d acting as a leaf spring.

Equally different to the first embodiment, the leaf spring 2g is embodied, for axially pretensioning the guide elements 4a, 4b in their directions of extension, as an H-shaped spring element whose two long legs extend in planes offset from each other by 90°, the short leg located centrically between the long legs being bent by 90°. Here, a long leg of the H-shaped spring element is screwed to the upper side of the frame part 2b via engagement sections or screw openings correspondingly provided for this purpose, with bolts, while the part of the leaf spring 2g pretensioning the guide elements 4a, 4b extends in parallel to the inner side of the frame part 2b facing the actuators 3a, 3b.

Figure 11A:
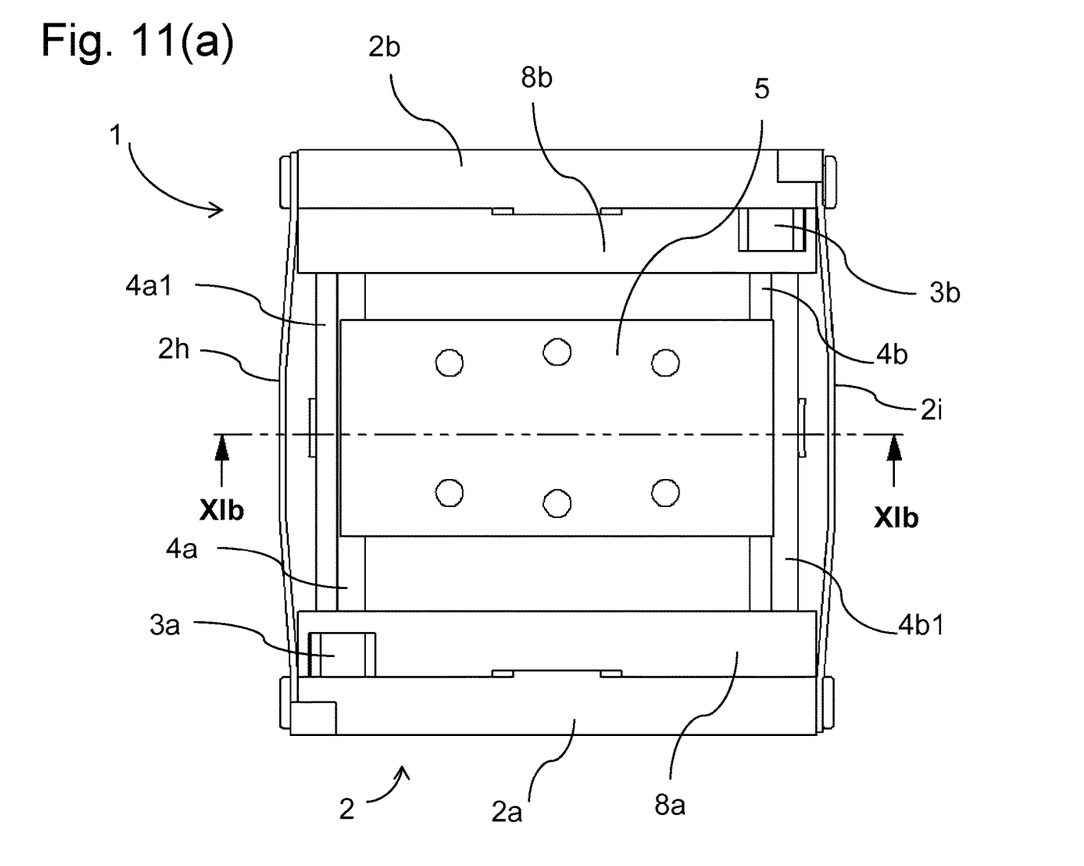
Figure 11B:
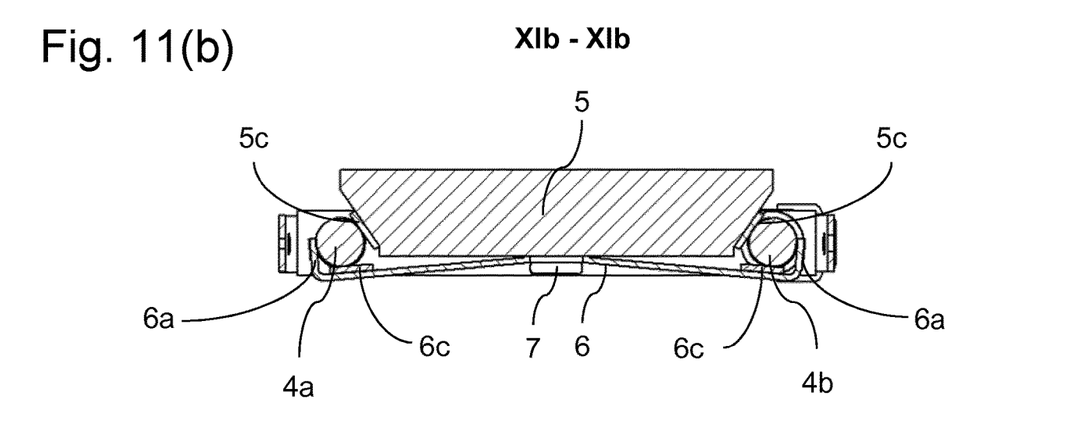
Figure 12:
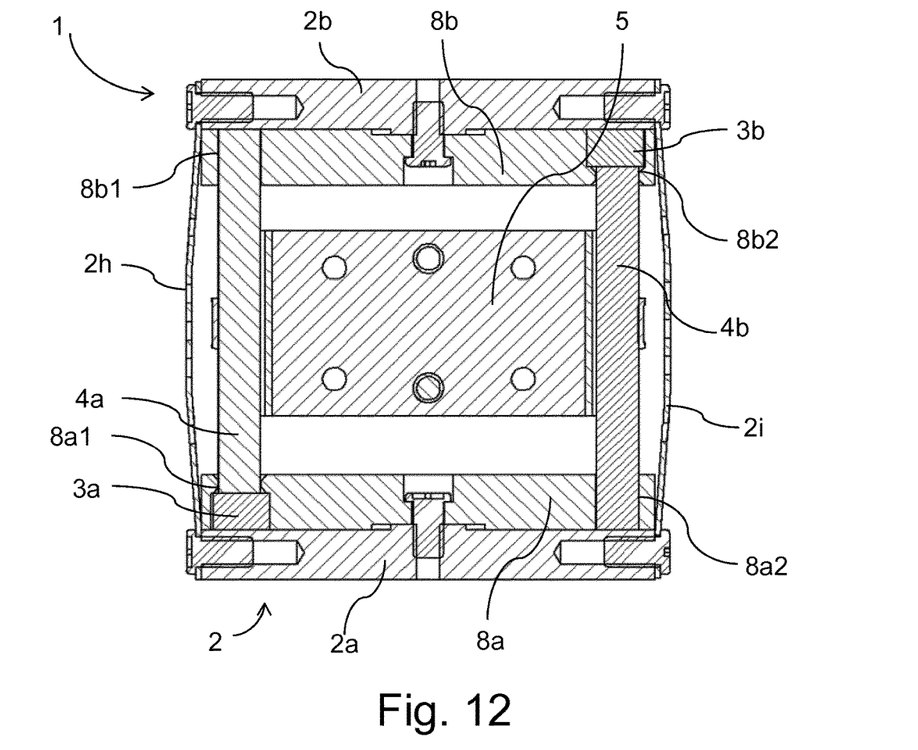
FIG. 12 shows a sectional view of the linear drive according to FIG. 11(a).

A third embodiment of the linear drive 1 according to the invention is represented in FIGS. 11 and 12. Similar to the first embodiment, the frame 2 is composed of a cuboid basic part 2a and a similar, preferably identical, counterpart 2b. The basic part 2a and the counterpart 2b are connected to each other via two leaf springs 2h, 2i which are preferably fixed to the basic part 2a and the counterpart 2b by threaded joints. A seating element 8a, 8b, which approximately has the same dimensions as the basic part 2a or the counterpart 2b, respectively, is fixed each to the basic part 2a and to the counterpart 2b, such that both seating elements 8a, 8b are opposed to each other within the frame 2. The attachment to the basic part 2a or to the counterpart is here preferably done via a threaded joint. The preferably identical seating elements 8a, 8b consist of an electrically non-conductive, preferably polymer-based material, and each have two through-holes 8a1, 8a2, 8b1, 8b2, in which the guide elements 4a, 4b are received and which serve as a sliding bearing.

A through-hole 8a1, 8b2 of each seating element 8a, 8b is designed such that the actuator 3a, 3b fixed to the respective guide element 4a, 4b can be additionally received therein, wherein an end face of the actuator 3a, 3b facing away from the respective guide element 4a, 4b is in contact with the basic part 2a or the counterpart 2b, respectively. In this embodiment, an actuator 3a is received in a through-hole 8a1 of the seating element 8a which is connected to the basic part 2a, and the other actuator 3b is received in a through-hole 8b2 of the seating element 8b which is connected to the counterpart 2b. Consequently, the actuators 3a, 3b are located diagonally opposed with respect to the frame 2.

Due to the leaf springs 2h, 2i which connect the basic part 2a and the counterpart 2b with each other, the guide elements 4a, 4b are pressed against their corresponding actuators 3a, 3b.

The movement element 5 is preferably provided with a spring element 6 in the form of a leaf spring via a threaded joint 7. The spring element 6 extends perpendicularly to the moving direction and protrudes beyond the side faces of the movement element 5 arranged in parallel to the moving direction such that each guide element 4a, 4b is received in a channel-like seating, which is received by a side face of the movement element 5 and a section of the spring element 6 which protrudes beyond the movement element 5. In particular, here, the side faces of the movement element 5 are embodied inclined to the main surfaces of the movement element 5 and provided with one or more contact sections 5c. Equally, the corresponding sections of the spring element are each provided with a contact section 6c, such that each guide element 4a, 4b is contacted directly via the contact sections 5c, 6c which serve as friction elements. By selecting various materials, dimensions and/or attachment points of the spring element 6, the contact pressure on the guide elements 4a, 4b can be varied.

Figure 13A:
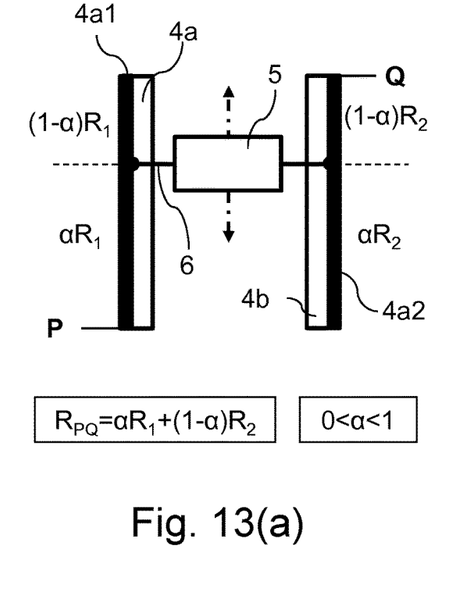
Figure 13B:
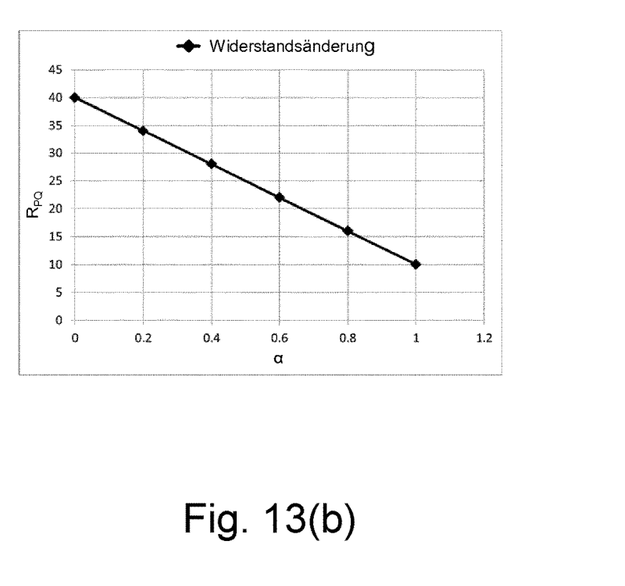

Furthermore, in this embodiment, a peripheral segment 4a1, 4b1 of each guide element 4a, 4b is provided with a resistance material. The spring element 6 of the movement element 5 has, at its outer ends, slide sections 6a which are in electrically conductive contact with the peripheral sections 4a1, 4b1 of the guide elements 4a, 4b. The spring element 6 itself is also designed to be electrically conductive. In this manner, a potentiometer can be realised by which the position of the movement element 5 can be determined, as is illustrated in FIG. 13 by way of example. In particular, the peripheral sections 4a1, 4b1 of the guide elements 4a, 4b have different resistance values R1, R2 for this purpose. Due to the different resistance values R1, R2, the resistance $R_{PQ}$ changes from one point P of the peripheral section 4a1 of the guide element 4a to a point Q of the peripheral section 4b1 of the other guide element 4b with the position of the movement element 5.

FIG. 13(a) schematically shows the preferred design of the potentiometer by which the position of the movement element 5 can be determined. To determine this position, one has to detect the electric resistance $R_{PQ}$ between the points P and Q which are located on opposite sides of one plane which extends through the movement element 5 and perpendicular to the moving direction. The position of the movement element 5 is indicated as normalised position α which can assume values between 0 and 1 and changes with the position of the movement element 5. The value 0 here preferably corresponds to a front end position of the movement element 5 where the movement element 5 is in contact with the seating element 8a, and the value 1 to a rear end position where the movement element 5 is in contact with the seating element 8b.

In this configuration, the resistance $R_{PQ}$ is calculated according to the following formula: $R_{PQ}=\alpha R_1+(1-\alpha R_2)$.

FIG. 13(b) shows, by way of example, the resistance values $R_{PQ}$ in response to the normalised position α of the movement element 5 with the assumption that R1 is 10 kΩ and R2 is 40 kΩ. By the detection of the resistance value $R_{PQ}$, one can consequently calculate the position of the movement element 5.

The inventive linear drives 1 according to the second and third inventive embodiments are couplable in the same way as the linear drives 1 according to the first inventive embodiment to form multiaxially displaceable arrangements. In contrast to the first and third inventive embodiments, the linear drive 1 according to the second inventive embodiment, however, has altogether fewer individual parts and a stabler basic construction, such that the freedom of motion of the individual components, in particular of the two guide elements 4a, 4b, is further restricted, and altogether, an even more precise positioning of the movement element 5 between the guide elements 4a, 4b can be achieved.

In the second and third inventive embodiments, similar elements are provided with the same reference numerals as in the first inventive embodiment. In order to avoid repetitions, a separate description of equally acting elements is omitted.

LIST OF REFERENCE NUMERALS 1 piezoelectric linear drive
2 frame
2a basic part
2a1 engagement section(s) or screw openings in the basic part
2b counterpart
2c, d side part(s) or leaf spring(s)
2e, f coupling section(s) or half bearing(s)
2g leaf spring
2h, i leaf spring
3 actuator unit
3a, b actuator(s)
4a, b guide element(s)
4a1, 4b1 peripheral sections of the guide elements 4a, 4b
5 movement element
5a body
5b seating(s)
5c contact section(s)
5d projection
5e engagement section(s) or screw openings in the movement element
5f engagement section(s) or screw openings in the movement element
6 spring element
6a slide section(s)
6c contact section(s)
7 threaded joint
8a, b seating element
8a1, 8a2 through-hole of the seating 8a
8b1, 8b2 through-hole of the seating 8b
A1 distance of the screw openings in the basic part
A2 distance of the screw openings in the movement element
B moving direction of the guide elements

The invention claimed is:

1. A linear drive, comprising:
an actuator unit with at least one actuator;
two guide elements;
a movement element, wherein the movement element is configured to be displaceable along both of the two guide elements as a result of a stick-slip effect by a movement generated by the actuator unit, wherein the movement element is configured to be brought into engagement with each of the two guide elements by static friction in order to be displaced along both of the two guide elements as a result of the stick-slip effect; and
a closed frame, which surrounds the actuator unit, the two guide elements and the movement element, wherein each of the two guide elements is resiliently mounted with respect to the closed frame transverse to the direction of extension of the respective one of the two guide elements, so that each of the two guide elements is resiliently pretensioned in a direction of the movement element and forces act in different directions.

2. The linear drive according to claim 1, wherein the actuator unit is configured to cause both of the two guide elements to move simultaneously and/or synchronously and/or along parallel trajectories.

3. The linear drive according to claim 1, wherein the movement element is, in a stress-free state of the actuator unit, engaged with each of the two guide elements by static friction.

4. The linear drive according to claim 1, wherein the actuator unit comprises:
two actuators, each of the two actuators drives a respective one of the two guide elements.

5. The linear drive according to claim 4, wherein each of the two actuators is arranged at a respective one end of the two guide elements and, with respect to a mid-plane that is perpendicular to a moving direction and bisects the two guide elements in the moving direction, are arranged on a same side or on opposite sides.

6. The linear drive according to claim 1, wherein each of the two guide elements and/or the movement element only has/have one translational degree of freedom.

7. The linear drive according to claim 1, wherein the movement element and the two guide elements are coupled such that in a stick phase between each of the two guide elements and the movement element, contact forces are generated in different directions and symmetrically to one plane.

8. The linear drive according to claim 1, wherein each of the two guide elements is configured as a cylinder and a trajectory of the two guide elements extends along an axis of the cylinder.

9. The linear drive according to claim 1, wherein the movement element receives each of the two guide elements in a separate channel-like seating, wherein the channel-like seating is embodied as a V-shaped groove which extends along a respective guide element and opens towards it.

10. The linear drive according to claim 1, wherein the closed frame has a cuboid outline.

11. The linear drive according to claim 1, wherein each of the two guide elements is resiliently mounted with respect to the closed frame of the linear drive, in and/or transverse to its direction of extension, via at least one leaf spring.

12. The linear drive according to claim 10, wherein each of the two guide elements is mounted, via a sliding bearing at the closed frame in a sliding manner.

13. The linear drive according to claim 1, wherein each of the two guide elements is resiliently pretensioned in a direction of the actuator unit.

14. The linear drive according to claim 1, wherein a spring element is fixed to the movement element, and each of the two guide elements is received in a channel-like seating which is formed by a section of the movement element and a section of the spring element.

15. The linear drive according to claim 14, wherein each of the two guide elements has a peripheral section which is provided with a resistance material, and the spring element has slide segments which are each in electrically conductive contact with a peripheral section of the corresponding guide element.

16. The linear drive according to claim 1, wherein the closed frame and/or the movement element has/have a mechanical interface which is/are couplable to a mechanical interface of an identical linear drive, so that travel ranges (X, Y, Z) of the linear drives coupled to each other extend in planes perpendicular with respect to each other.

17. An arrangement, comprising:
two or three linear drives, wherein each of the two or three linear drives is configured according to claim 1, wherein the two or three linear drives are coupled to each other such that travel ranges (X, Y, Z) of the two or three linear drives coupled to each other extend in two or three planes, respectively, perpendicular with respect to each other.

18. The linear drive according to claim 1, wherein each of the two guide elements and/or the movement element only has/have one translational degree of freedom, wherein plural translational degrees of freedom of each of the two guide elements and/or the movement element are in parallel directions.

19. The linear drive according to claim 1, wherein the movement element is, in a stress-free state of the actuator unit, engaged with each of the two guide elements by means of static friction.

20. A method of determining a position of a movement element with a linear drive, the linear drive including:
an actuator unit with at least one actuator;
two guide elements;
a movement element, wherein the movement is configured to be displaceable along both of the two guide elements as a result of a stick-slip effect by a movement generated by the actuator unit, wherein the movement element is configured to be brought into engagement with each of the two guide elements by static friction in order to be displaced along both of the two guide elements as a result of the stick-slip effect; and
a closed frame, which surrounds the actuator unit, the two guide elements and the movement element, wherein each of the two guide elements is resiliently mounted with respect to the closed frame transverse to the direction of extension of the respective one of the two guide elements, so that each of the two guide elements is resiliently pretensioned in a direction of the movement element and forces act in different directions;
wherein a spring element is fixed to the movement element, and each of the two guide elements is received in a channel-like seating which is formed by a section of the movement element and a section of the spring element;
wherein each of the two guide elements has a peripheral section which is provided with a resistance material, and the spring element has slide segments which are each in electrically conductive contact with a peripheral section of the corresponding guide element;
wherein the method comprises:
detecting a resistance from one point (P) of the peripheral section of one of the two guide elements to a point (Q) of the peripheral section of the other guide element.

* * * * *